US011827788B2

(12) United States Patent
Stewart et al.

(10) Patent No.: US 11,827,788 B2
(45) Date of Patent: Nov. 28, 2023

(54) FASTER CURE POLYASPARTIC RESINS FOR FASTER PHYSICAL PROPERTY DEVELOPMENT IN COATINGS

(71) Applicant: Covestro LLC, Pittsburgh, PA (US)

(72) Inventors: Matthew Stewart, Wexford, PA (US); Joseph Pierce, Pittsburgh, PA (US); Wendy S. Gustavich, Maynard, OH (US); Michael Jeffries, Follansbee, WV (US); Robert A. Wade, Oakdale, PA (US); Myron W. Shaffer, New Cumberland, WV (US)

(73) Assignee: Covestro LLC, Pittsburgh, PA (US)

( * ) Notice: Subject to any disclaimer, the term of this patent is extended or adjusted under 35 U.S.C. 154(b) by 617 days.

(21) Appl. No.: 16/594,357

(22) Filed: Oct. 7, 2019

(65) Prior Publication Data
US 2021/0102064 A1  Apr. 8, 2021

(51) Int. Cl.
C08L 77/06      (2006.01)
C08G 18/60      (2006.01)
C08G 18/73      (2006.01)
C08G 18/75      (2006.01)
C08G 69/26      (2006.01)
C08L 75/02      (2006.01)
C09D 175/02     (2006.01)

(52) U.S. Cl.
CPC ............ C08L 77/06 (2013.01); C08G 18/603 (2013.01); C08G 18/73 (2013.01); C08G 18/753 (2013.01); C08G 69/26 (2013.01); C08L 75/02 (2013.01); C09D 175/02 (2013.01)

(58) Field of Classification Search
CPC . C08G 2150/00; C09D 175/02; C08K 5/1345
See application file for complete search history.

(56) References Cited

U.S. PATENT DOCUMENTS

| | | |
|---|---|---|
| 3,317,609 A | 5/1967 | Lesesne |
| 5,243,012 A | 9/1993 | Wicks et al. |
| 5,364,955 A | 11/1994 | Zwiener et al. |
| 5,444,117 A | 8/1995 | Wade et al. |
| 5,489,704 A | 2/1996 | Squiller et al. |
| 5,516,873 A | 5/1996 | Hicks et al. |
| 5,529,739 A | 6/1996 | Jonsson et al. |
| 5,561,211 A | 10/1996 | Yonek et al. |
| 5,580,945 A | 12/1996 | Wade et al. |
| 5,623,045 A | 4/1997 | Zwiener et al. |
| 5,629,403 A | 5/1997 | Hicks et al. |
| 5,633,336 A | 5/1997 | Gras et al. |
| 5,633,389 A | 5/1997 | Jonsson et al. |
| 5,726,272 A | 3/1998 | Yonek |
| 5,736,604 A | 4/1998 | Luthra |
| 5,807,924 A | 9/1998 | Becker et al. |
| 5,885,474 A | 3/1999 | Reiners et al. |
| 5,925,711 A | 7/1999 | Wamprecht et al. |
| 5,977,246 A | 11/1999 | Fenn |
| 5,977,546 A | 11/1999 | Carlson |
| 6,169,141 B1 | 1/2001 | Kurek et al. |
| 6,350,823 B1 | 2/2002 | Goeb et al. |
| 6,458,293 B1 | 10/2002 | Roesler et al. |
| 6,590,066 B1 | 7/2003 | Roesler |
| 6,828,405 B1 | 12/2004 | Cai |
| 2001/0021745 A1 | 9/2001 | Laginess et al. |
| 2002/0103326 A1 | 8/2002 | Primeaux et al. |
| 2002/0132965 A1 | 9/2002 | Gertzmann et al. |
| 2002/0166630 A1 | 11/2002 | Bonilla |
| 2003/0105220 A1 | 6/2003 | Gupta et al. |
| 2004/0067315 A1 | 4/2004 | Niesten et al. |
| 2004/0110917 A1 | 6/2004 | Danielmeier et al. |
| 2005/0038190 A1 | 2/2005 | Kuntimaddi |
| 2005/0059790 A1 | 3/2005 | Grace et al. |
| 2005/0059792 A1 | 3/2005 | Henderson et al. |
| 2005/0075476 A1 | 4/2005 | Roesler et al. |
| 2005/0075477 A1 | 4/2005 | Roesler et al. |
| 2005/0106395 A1 | 5/2005 | Asher |
| 2005/0159560 A1 | 7/2005 | Danielmeier et al. |
| 2005/0282933 A1 | 12/2005 | Patel et al. |
| 2006/0141161 A1 | 6/2006 | Lenges et al. |
| 2006/0155053 A1 | 7/2006 | Lenges et al. |
| 2006/0155055 A1 | 7/2006 | Reinartz et al. |
| 2006/0155056 A1 | 7/2006 | Lenges et al. |
| 2006/0247371 A1 | 11/2006 | Mundstock et al. |
| 2007/0078255 A1 | 4/2007 | Mager et al. |
| 2007/0100112 A1 | 5/2007 | Sarpeshkar et al. |
| 2007/0208156 A1 | 9/2007 | Posey et al. |
| 2008/0145696 A1 | 6/2008 | Senkfor et al. |
| 2009/0030161 A1 | 1/2009 | Johnston et al. |
| 2009/0197092 A1 | 8/2009 | Kendi et al. |
| 2009/0285994 A1 | 11/2009 | Verborgt et al. |
| 2010/0261825 A1 | 10/2010 | Senkfor et al. |
| 2010/0266764 A1 | 10/2010 | Robinson et al. |
| 2011/0070387 A1 | 3/2011 | Schmidt et al. |
| 2011/0082273 A1 | 4/2011 | Laas et al. |
| 2011/0206935 A1 | 8/2011 | Barancyk et al. |

(Continued)

FOREIGN PATENT DOCUMENTS

| | | |
|---|---|---|
| CA | 2018803 A1 | 12/1990 |
| CA | 2048444 A1 | 2/1992 |

(Continued)

OTHER PUBLICATIONS

Zheng et al ,CN 103242503, published on Aug. 2013.*

Primary Examiner — Gregory Listvoyb
(74) Attorney, Agent, or Firm — John E. Mrozinski, Jr.; Jed C. Benson; Richard P. Bender

(57) ABSTRACT

A polyaspartate composition is provided which comprises a reaction product of a diamine and a diester reacted at a ratio of diamine equivalents to diester equivalents of from 1:0.95 to 1:0.50. The polyaspartate compositions of the invention may be combined with polyisocyanates to produce polyurea compositions, e.g., coatings, adhesives, sealants, composites, castings, and films, which exhibit a faster cure time along with faster development time for physical properties such as hardness and tensile strength.

6 Claims, 5 Drawing Sheets

(56) References Cited

U.S. PATENT DOCUMENTS

| | | |
|---|---|---|
| 2011/0217255 A1 | 9/2011 | Kim et al. |
| 2013/0004777 A1 | 1/2013 | Sheth et al. |
| 2013/0116379 A1 | 5/2013 | Wamprecht |
| 2013/0172475 A1 | 7/2013 | Zhang et al. |
| 2013/0203934 A1 | 8/2013 | Best et al. |
| 2014/0010956 A1 | 1/2014 | Prince et al. |
| 2014/0094566 A1 | 4/2014 | Garbe et al. |
| 2014/0221567 A1 | 8/2014 | Fazel et al. |
| 2014/0272162 A1 | 9/2014 | Olson |
| 2014/0272424 A1 | 9/2014 | Olson |
| 2015/0031807 A1 | 1/2015 | Tanghe et al. |
| 2015/0079294 A1 | 3/2015 | Best et al. |
| 2015/0104652 A1 | 4/2015 | Kugel et al. |
| 2015/0105517 A1 | 4/2015 | Baukema et al. |
| 2016/0024339 A1 | 1/2016 | Squiller et al. |
| 2016/0060380 A1 | 3/2016 | Laas et al. |
| 2016/0083593 A1 | 3/2016 | Marauska et al. |
| 2016/0115351 A1 | 4/2016 | Iezzi |
| 2016/0160356 A1 | 6/2016 | Wissing |
| 2016/0289456 A1 | 10/2016 | Ciglar et al. |

FOREIGN PATENT DOCUMENTS

| | | | |
|---|---|---|---|
| CA | 2184236 A1 | | 3/1997 |
| CA | 2221676 A1 | | 6/1998 |
| CN | 103242503 A | | 8/2013 |
| DE | 102006002153 | * | 7/2007 |
| DE | 102006002153 A | | 7/2007 |
| WO | 0107399 A1 | | 2/2001 |
| WO | WO 2010112157 A1 | | 10/2010 |

* cited by examiner

FIG. I

FASTER CURE POLYASPARTIC RESINS FOR FASTER PHYSICAL PROPERTY DEVELOPMENT IN COATINGS

FIELD OF THE INVENTION

The present invention relates in general to polyurethanes and polyureas, and more specifically, to polyaspartic resins with faster curing time for faster physical property development in polyurea coatings made with those resins.

BACKGROUND OF THE INVENTION

Two-component coating systems and compositions based on polyurethanes or polyureas are widely used in industry because of the many advantageous properties exhibited by these coating chemistries. Two-component coating systems generally comprise a liquid binder component and a liquid hardener/crosslinker component. The liquid binder component may comprise an isocyanate-reactive component such a polyol or polyamine, and the liquid crosslinker component may comprise a polyisocyanate component. The addition reaction of the polyisocyanate component with the isocyanate-reactive component produces highly crosslinked polyurea or polyurethane networks that form coating films which are applied to substrates.

Although many polyurea coatings containing polyaspartate compositions can cure quickly, those coatings do not have a fast development of physical properties such as hardness and tensile strength.

Therefore, a need continues to exist in the art for a fast curing coating which also has fast physical property development.

SUMMARY OF THE INVENTION

Accordingly, the present invention reduces problems inherent in the art by providing a polyaspartate composition comprising a reaction product of a diamine and a diester, reacted at a ratio of diamine equivalents to diester equivalents of from 1:0.95 to 1:0.50 instead of the typical 1:1. Polyurea coatings made with the inventive polyaspartate compositions exhibit faster cure times with faster physical property (such as hardness and tensile strength) development. Suitable substrates for coatings made with the inventive polyaspartate composition include metals, plastics, wood, cement, concrete, and glass.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
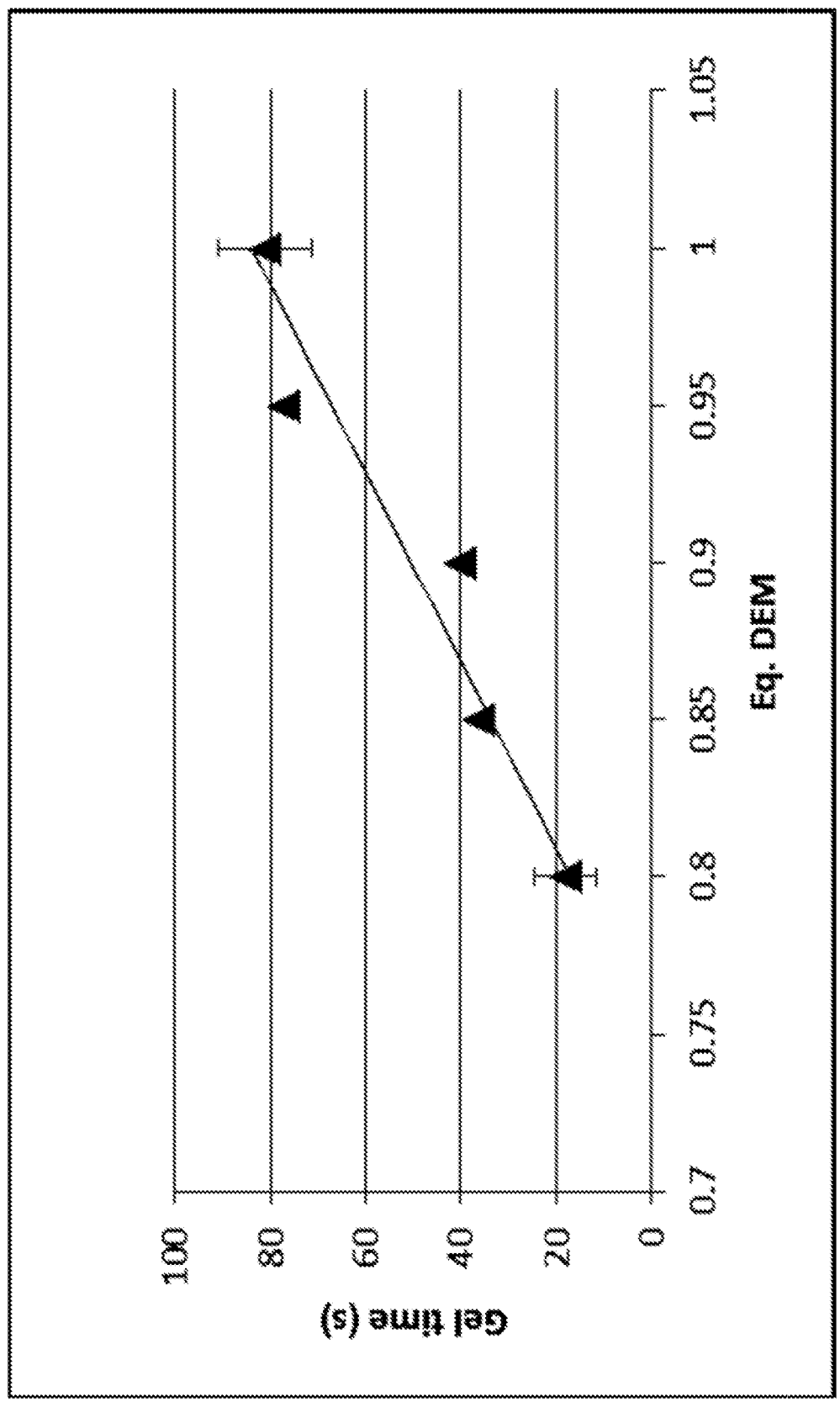
FIG. 1 shows a plot of gel time in seconds versus the average number of equivalents of diester (diethyl maleate) to 1 equivalent of methylpentamethylenediamine.

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In a first aspect, the present invention is directed to a polyaspartate composition comprising a reaction product of a diamine and a diester reacted at a ratio of diamine equivalents to diester equivalents of from 1:0.95 to 1:0.50.

In another aspect, the present invention is directed to a polyurea composition comprising a reaction product of a polyisocyanate and a polyaspartate composition, wherein the polyaspartate composition comprises a reaction product of a diamine and a diester reacted at a ratio of diamine equivalents to diester equivalents of from 1:0.95 to 1:0.50. The inventive polyurea composition may provide improved coatings, adhesives, sealants, composites, castings, and films.

In still another aspect, the present invention is directed to a polyurea coating composition comprising: a reaction product of a polyisocyanate and a polyaspartate composition, wherein the polyaspartate composition comprises a reaction product of a diamine and a diester reacted at a ratio of diamine equivalents to diester equivalents of from 1:0.95 to 1:0.50.

In yet another aspect, the present invention is directed to a substrate having applied thereto a polyurea coating composition comprising: a reaction product of a polyisocyanate and a polyaspartate composition, wherein the polyaspartate composition comprises a reaction product of a diamine and a diester reacted at a ratio of diamine equivalents to diester equivalents of from 1:0.95 to 1:0.50.

In still yet another aspect, the present invention is directed to a method of making a polyaspartate composition comprising reacting a diamine and a diester at a ratio of diamine equivalents to diester equivalents of from 1:0.95 to 1:0.50.

In an additional aspect, the present invention is directed to a method of making a polyurea composition comprising reacting a polyisocyanate with a polyaspartate composition, wherein the polyaspartate composition comprises a reaction product of a diamine and a diester reacted at a ratio of diamine equivalents to diester equivalents of from 1:0.95 to 1:0.50.

In a further aspect, the present invention is directed to a method of decreasing at least one of cure time and physical property development time in a first polyurea composition compared to a second polyurea composition, the method comprising: reacting a first polyaspartate composition comprising a reaction product of a diamine and a diester reacted at a ratio of diamine equivalents to diester equivalents of from 1:0.95 to 1:0.50, with a polyisocyanate to produce the first polyurea composition, wherein the second polyurea composition comprises a reaction product of a second polyaspartate composition comprising a reaction product of a diamine and a diester reacted at a ratio of diamine equivalents to diester equivalents of 1:1, with a polyisocyanate, wherein the physical property is selected from the group consisting of hardness and tensile strength.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

As used herein, the term "coating composition" refers to a mixture of chemical components that will cure and form a coating when applied to a substrate.

The terms "adhesive" or "adhesive composition", refers to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant" or "sealant composition" refers to a composition which may be applied to one or more surfaces to form a protective barrier, for example to prevent ingress or egress of solid, liquid or gaseous material or alternatively to allow selective permeability through the barrier to gas and liquid. In particular, it may provide a seal between surfaces.

A "casting" or "casting composition" refers to a mixture of liquid chemical components which is usually poured into a mold containing a hollow cavity of the desired shape, and then allowed to solidify.

A "composite" or "composite composition" refers to a material made from one or more polymers, containing at least one other type of material (e.g., a fiber) which retains its identity while contributing desirable properties to the composite. A composite has different properties from those of the individual polymers/materials which make it up.

"Cured," "cured composition" or "cured compound" refers to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As used herein, the term "pot life" refers to the period of time from the initial mixture of two or more mutually reactive components of a coating system to the point at which the resulting coating composition exhibits a workable viscosity.

As used herein, the term "cure time" refers to the time to achieve Stage D (Method B) as defined in ASTM D5895-03 (2008)—*Standard Test Methods for Evaluating Drying or Curing During Film Formation of Organic Coatings Using Mechanical Recorder.*

As used herein, the term "polyurethane" refers to polymeric or oligomeric materials comprising urethane groups, urea groups, or both. Accordingly, as used herein, the term "polyurethane" is synonymous with the terms polyurea, polyurethane/urea, and modifications thereof. The term "polyurethane" also refers to crosslinked polymer networks in which the crosslinks comprise urethane and/or urea linkages, and/or the constituent polymer chains comprise urethane and/or urea linkages. Carbodiimide crosslinking as is known to those skilled in the art is also contemplated in the coatings of the invention.

The coating compositions described in this Specification may comprise a two-component coating composition. As used herein, the term "two-component" refers to a coating or coating composition comprising at least two components that must be stored in separate containers because of their mutual reactivity. For instance, two-component polyurea coating systems and compositions may comprise a hardener/crosslinker component comprising an isocyanate-functional compound, and a separate binder component comprising an amino-functional compound. The two separate components are generally not mixed until shortly before application because of the limited pot life of the mixture. When the two separate components are mixed and applied as a film on a substrate, the mutually reactive compounds in the two components react to crosslink and form a cured coating film.

As used herein, the term "polyamine" refers to compounds comprising at least two free primary and/or secondary amine groups. Polyamines include polymers comprising at least two pendant and/or terminal amine groups.

As used herein, the term "polyisocyanate" refers to compounds comprising at least two un-reacted isocyanate groups. Polyisocyanates include diisocyanates and diisocyanate reaction products comprising, for example, biuret, isocyanurate, uretdione, urethane, urea, iminooxadiazine dione, oxadiazine dione, carbodiimide, acyl urea, allophanate groups, and combinations of any thereof.

The polyisocyanate useful in the present invention may comprise any organic polyisocyanate having aliphatically, cycloaliphatically, araliphatically, and/or aromatically bound free isocyanate groups, which are liquid at room temperature or are dispersed in a solvent or solvent mixture at room temperature. In various non-limiting embodiments, the polyisocyanate may have a viscosity of from 10-15,000 mPa s at 23° C., 10-5,000 mPa s at 23° C., or 50-1,000 mPa s at 23° C. In certain embodiments, the polyisocyanate may comprise polyisocyanates or polyisocyanate mixtures having exclusively aliphatically and/or cycloaliphatically bound isocyanate groups with an (average) NCO functionality of 2.0-5.0 and a viscosity of from 10-5,000 mPa s at 23° C., 50-1,000 mPa s at 23° C., or 100 -1,000 mPa s at 23° C.

In various embodiments, the polyisocyanate may comprise polyisocyanates or polyisocyanate mixtures based on one or more aliphatic or cycloaliphatic diisocyanates, such as, for example, ethylene diisocyanate; 1,4-tetramethylene diisocyanate; 1,6-hexamethylene diisocyanate (HDI); 2,2,4-trimethyl -1,6-hexamethylene diisocyanate; 1,12-dodecamethylene diisocyanate; 1-isocyanato -3-isocyanatomethyl-3,5,5-trimethyl-cyclohexane (isophorone diisocyanate or IPDI); bis-(4-isocyanatocyclohexyl)methane ($H_{12}$MDI); cyclohexane 1,4-diisocyanate; bis-(4-isocyanato-3-methyl-cyclohexyl)methane; PDI (pentane diisocyanate-bio-based) isomers of any thereof; or combinations of any thereof. In various embodiments, the polyisocyanate component may comprise polyisocyanates or polyisocyanate mixtures based on one or more aromatic diisocyanates, such as, for example, benzene diisocyanate; toluene diisocyanate (TDI); diphenylmethane diisocyanate (MDI); isomers of any thereof; or combinations of any thereof. In various embodiments, the polyisocyanate component may comprise a triisocyanate, such as, for example, 4-isocyanatomethyl-1,8-octane diisocyanate (triisocyanatononane or TIN); isomers thereof; or derivatives thereof.

Additional polyisocyanates (including various diisocyanates) that may also be included in the polyurea coating of the present invention may include the polyisocyanates described in U.S. Pat. Nos. 5,075,370; 5,304,400; 5,252, 696; 5,750,613; and 7,205,356. Combinations of any of the above-identified polyisocyanates may also be used.

The di- and tri-isocyanates indicated may be used as such, or as derivative polyisocyanates comprising biuret, isocyanurate, uretdione, urethane, urea, iminooxadiazine dione, oxadiazine trione, carbodiimide, acyl urea, and/or allophanate groups. In various non-limiting embodiments, derivative polyisocyanates comprising biuret, isocyanurate, uretdione, urethane, iminooxadiazine dione, oxadiazine trione, carbodiimide, acyl urea, and/or allophanate groups are included in the polyurea. In various embodiments, the polyisocyanate component comprises one or more of the above-identified structural groups prepared from IPDI, HDI, $H_{12}$MDI, and/or cyclohexane 1,4-diisocyanate.

The polyisocyanate may be hydrophilically-modified to be water-dispersible. Hydrophilically-modified water-dispersible polyisocyanates are obtainable, for example, by covalent modification with an internal emulsifier comprising anionic, cationic, or nonionic groups.

Polyether urethane type water-dispersible polyisocyanates may be formed, for example, from a reaction between polyisocyanates and less than stoichiometric amounts of monohydric polyalkylene oxide polyether alcohols. The preparation of such hydrophilically-modified polyisocyanates is described, for example, in U.S. Pat. No. 5,252,696. Polyether allophanate type water-dispersible polyisocyanates may be formed, for example, from a reaction between a polyalkylene oxide polyether alcohol and two polyisocyanate molecules under allophanation conditions. The preparation of such hydrophilically-modified polyisocyanates is described, for example, in U.S. Pat. No. 6,426,414. The polyalkylene oxide polyether alcohol used to prepare polyether type hydrophilically-modified water-dispersible polyisocyanates may comprise, for example, polyethylene oxide residues and/or polypropylene oxide residues.

Polyisocyanates may also be covalently modified with ionic or potentially ionic internal emulsifying groups to form hydrophilically-modified water-dispersible polyisocyanates. The ionic or potentially ionic groups may be cationic or anionic. As used herein, the term "ionic or potentially ionic group" refers to a chemical group that is nonionic under certain conditions and ionic under certain other conditions. For example, in various embodiments, the ionic group or potentially ionic group may comprise a carboxylic acid group; a carboxylate group; a sulfonic acid group; a sulfonate group; a phosphonic acid group; a phosphonate group; or combinations of any thereof. In this regard, for example, carboxylic acid groups, sulfonic acid groups, and phosphonic acid groups are potentially ionic groups, whereas, carboxylate groups, sulfonate groups, and phosphonate groups are ionic groups in the form of a salt, such as, for example, a sodium salt.

For example, carboxylate (carboxylic acid) groups, sulfonate (sulfonic acid) groups, or phosphonate (phosphonic acid) groups may be covalently introduced into polyisocyanates to form hydrophilically-modified water-dispersible polyisocyanates. The ionic or potentially ionic groups may be introduced through a reaction between the isocyanate groups of the polyisocyanate and less than stoichiometric amounts of amino-functional or hydroxy-functional carboxylic acids, sulfonic acids, phosphonic acids, or salts thereof. Examples include, but are not limited to dimethylolpropionic acid (DMPA), N-(2-aminoethyl)-2-aminoethane sulfonic acid (AAS); N-(2-aminoethyl)-2-aminopropionic acid; 2-(cyclohexyl-amino)-ethane sulfonic acid; 3-(cyclohexyl-amino)-1-propane sulfonic acid (CAPS); 2-aminoethylphosphonic acid; or the salts thereof.

If free carboxylic acids, sulfonic acids, or phosphonic acids are incorporated in the polyisocyanate, then the acids may be neutralized with a neutralizing agent, such as, for example, tertiary amines, including, but not limited to, trialkyl-substituted tertiary amines. The preparation of hydrophilically-modified water-dispersible polyisocyanates is described, for example, in U.S. Pat. No. 6,767,958. Water-dispersible polyisocyanate mixtures based on triisocyanatononane (TIN) are described in International Patent Application Publication No. WO01/62819.

The NCO content of nonionic type hydrophilically-modified water-dispersible polyisocyanates may be from 5 to 25 weight percent of the polyisocyanate molecule. The NCO content of ionic type hydrophilically-modified water-dispersible polyisocyanates may be from 4 to 26 weight percent of the polyisocyanate molecule.

The polyaspartate composition may include one or more polyaspartic esters corresponding to formula (I):

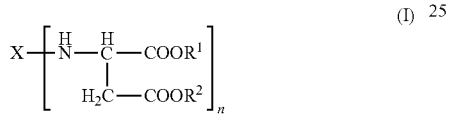

wherein:
n is an integer of 2 to 4
X represents an aliphatic or aromatic residue;
$R^1$ and $R^2$ independently of each other represent organic groups that are inert to isocyanate groups under reaction conditions; and
n is at least 2.

In formula (I), the aliphatic residue X may correspond to a straight or branched alkyl and/or cycloalkyl residue of an n-valent polyamine that is reacted with a dialkylmaleate in a Michael addition reaction to produce a polyaspartic ester. For example, the residue X may correspond to an aliphatic residue from an n-valent polyamine including, but not limited to, ethylene diamine; 1,2-diaminopropane; 1,4-diaminobutane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1-amino-3,3,5-trimethyl-5-amino-methylcyclohexane; 2,4'- and/or 4,4'-diaminodicyclohexylmethane; 3,3'-dimethyl-4,4'-diaminodicyclohexylmethane; 2,4,4'-triamino -5-methyldicyclohexylmethane; polyether polyamines with aliphatically bound primary amino groups and having a number average molecular weight (Me) of 148 to 6000 g/mol; isomers of any thereof, and combinations of any thereof.

In various embodiments, the residue X may be obtained from 1,4-diaminobutane; 1,6-diaminohexane; 2,2,4- and/or 2,4,4-trimethyl-1,6-diaminohexane; 1-amino-3,3,5-trimethyl-5-aminomethylcyclohexane; 4,4'-diaminodicyclohexylmethane; 3,3'-dimethyl-4,4'-diaminodicyclohexylmethane; or 1,5-diamine -2-methyl-pentane.

The phrase "inert to isocyanate groups under reaction conditions," which is used to define groups $R^1$ and $R^2$ in formula (I), means that these groups do not have Zerevitinov-active hydrogens. Zerevitinov-active hydrogen is defined in Rompp's Chemical Dictionary (Rommp Chemie Lexikon), 10th ed., Georg Thieme Verlag Stuttgart, 1996. Generally, groups with Zerevitinov-active hydrogen are understood in the art to mean hydroxyl (OH), amino ($NH_x$), and thiol (SH) groups. In various embodiments, $R^1$ and $R^2$, independently of one another, are $C_1$ to $C_{10}$ alkyl residues, such as, for example, methyl, ethyl, or butyl residues.

In various embodiments, the polyaspartate composition comprises one or more compounds corresponding to formula (I) in which n is an integer from 2 to 6, in some embodiments from 2 to 4, and in some embodiments 2. In embodiments, where n=2, the polyaspartate composition may comprise one or more compounds corresponding to formula (II):

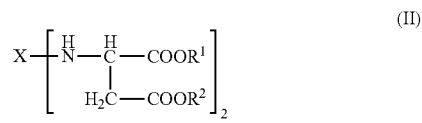

The polyaspartate composition may be produced by reacting the corresponding primary polyamines of the formula:

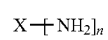

with a diester of the formula:

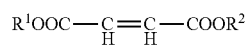

Examples of polyamines suitable in the present invention include, but are not limited to, diamines such as 2-methylpentamethylenediamine (MPMD), 2,2'-dimethyl -4,4'-methylenebis(cyclohexylamine), 4,4'-methylenebis(cyclohexylamine) (PACM), and diethyltoluenediamine (DETDA). Examples of suitable diesters include, but are not limited to, dimethyl maleate, diethyl maleate, dibutyl maleate, and the corresponding fumarates.

The production of the inventive polyaspartate composition from the above-mentioned polyamine and diester starting materials may take place within a temperature range of 0° C. to 100° C., in certain embodiments, the temperature is 25° C. to 70° C. The reaction may take place in the presence or absence of suitable solvents, such as methanol, ethanol, propanol, dioxane, or combinations of any thereof.

Embodiments of the instant invention are directed to polyaspartate compositions made a ratio differing from the standard 1:1 ratio of diamine equivalents to diester equivalents. In various embodiments of the inventive polyaspartate composition, 5% less diester equivalents are used in the synthesis (i.e., 1:0.95 equivalents), in other embodiments, 10% less diester equivalents are used in the synthesis (i.e., 1:0.90 equivalents), in further embodiments, 15% less diester equivalents are used in the synthesis (i.e., 1:0.85 equivalents), in certain embodiments, 20% less diester equivalents are used in the synthesis (i.e., 1:0.80 equivalents), in selected embodiments 30% less diester equivalents are used in the synthesis (i.e., 1:0.70 equivalents), and in some embodiments 50% less diester equivalents (1:0.5 equivalents) may be used in the synthesis.

To prepare the two-component polyurea compositions according to the invention, the polyisocyanate and polyaspartate composition and optional additives may be mixed with water in any order. In some embodiments, the polyaspartate composition is mixed with any desired additives and then with the polyisocyanate. The resulting mixture is dispersed in water in a known manner with simple mixing. However, it is also possible to introduce one of the reactive components, preferably the polyaspartate composition, with water and then introduce the polyisocyanate.

The polyisocyanate and polyaspartate composition are mixed in amounts which correspond to a minimum equivalent ratio of isocyanate groups to amino groups in some embodiments of 0.9:1, in other embodiments 1.7:1, and in yet other embodiments 4:1, and a maximum equivalent ratio of 20:1, preferably 12:1. If polyurea compositions are desired that have better chemical resistance then higher NCO:NH equivalent ratios are used. The flexibility/hardness of the polyurea composition may be further modified, e.g., by the selection of the diamine used to prepare the polyaspartate composition.

The inventive polyurea compositions may be applied to a substrate in the form of a coating composition by conventional methods such as painting, rolling, pouring or spraying. Suitable substrates include, but are not limited to, metals, plastics, wood, cement, concrete and glass. The substrates to be coated by the polyurea coating composition according to the invention may be treated with suitable primers.

The coating compositions according to the invention may also contain additives such as fillers, plasticizers, pigments, carbon black, silica sols, levelling agents, wetting agents, antifoaming agents and stabilizers.

Although the present invention is described and exemplified in the instant Specification in the context of a polyurea coating composition, the invention is not intended to be so limited. The principles of the invention are equally applicable to polyurethane, polyurea, polyurethane/urea coatings, adhesives, sealants, composites, castings, and films.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

| | |
|---|---|
| PAS A | a commercially available polyaspartate, N,N'-diethylmaleate-2-methyl-pentamethylene diamine used as a control; |
| PAS B | a proprietary polyaspartate, N,N'-diethylmaleate-2-methyl-pentamethylene diamine made according to the invention (having 5% less DEM); |
| PAS C | a proprietary polyaspartate, N,N'-diethylmaleate-2-methyl-pentamethylene diamine made according to the invention (having 10% less DEM); |
| PAS D | a proprietary polyaspartate, N,N'-diethylmaleate-2-methyl-pentamethylene diamine made according to the invention (having 15% less DEM); |
| PAS E | a proprietary polyaspartate, N,N'-diethylmaleate-2-methyl-pentamethylene diamine made according to the invention (having 20% less DEM); |
| ISOCYANATE A | an aliphatic polyisocyanate resin based on hexamethylene diisocyanate, NCO content 23.5 ± 0.5%, viscosity 730 ± 100 mPa · s @ 23°C., commercially available from Covestro as DESMODUR N-3900; |
| ISOCYANATE B | a polyfunctional aliphatic isocyanate resin based on hexamethylene diisocyanate (HDI) having an NCO content of 19.5 ± 0.5% and a viscosity of 450 ± 150 mPa · s @ 25° C., commercially available from Covestro as DESMODUR XP-2580; |
| DIESTER A | diethyl maleate (DEM), commercially available from DSM Resins; |
| DIAMINE A | 2-methylpentamethylenediamine (MPMD), commercially available from INVISTA as DYTEK A; |
| DIAMINE B | 2,2'-dimethyl-4,4'-methylenebis(cyclohexylamine), commercially available from BASF as LAROMIN C 260; |
| DIAMINE C | diethyltoluenediamine (DETDA), commercially available from Covestro as BAYTEC 505; and |
| STABILIZER A | butylated hydroxytoluene (BHT). |

POLYASPARTATES B, C, D, and E were prepared from the raw materials in the amounts as specified in the table below:

| Formulation Raw Materials (normalized to 100 by weight) | | | | |
|---|---|---|---|---|
| | PAS | | | |
| | B | C | D | E |
| DIAMINE A | 26.21 | 27.27 | 28.42 | 29.67 |
| DIESTER A | 73.79 | 72.73 | 71.58 | 70.33 |
| DIAMINE:DIESTER equivalent ratio | 1:0.95 | 1:0.90 | 1:0.85 | 1:0.80 |
| Theoretical Properties (Calculated) | | | | |
| Amine Eq. Wt. | 221.66 | 213.05 | 204.44 | 195.84 |

In each case, DIAMINE A was added to a clean, dry, one-liter, three-neck flask equipped with a stirrer. The flask was fitted with temperature measurement capability, nitrogen and a cold water condenser. An addition funnel was used to add DIESTER A at a rate so as to keep the temperature less than 70 C.

Polyaspartate compositions were made at equivalent ratios of DIAMINE A to DIESTER A as shown in Table I and reacted with ISOCYANATE A. The initial gel times were measured and are summarized in Table I. Gel time was measured by mixing the polyaspartate and polyisocyanate and recording the time at which the mixture no longer flowed off a spatula under gravity. CONTROL, Example 1, was the commercially available PAS A. As can be seen by reference to Table I, reducing the amount of equivalents of diester by 10% (Ex. 3) compared to CONTROL resulted in a gel time of approximately one-half that of the CONTROL. Reducing the amount of diester equivalents by an additional 10% (Ex. 5) again cut the gel time in half. This data is presented graphically in FIG. 1.

TABLE I

| Ex. No. | PAS | Equivalent Ratio (Diamine:Diester) | Iso. | Avg. Gel Time (seconds) |
|---|---|---|---|---|
| 1 | A | 1:1 | A | 81 |
| 2 | B | 1:0.95 | A | 77 |
| 3 | C | 1:0.90 | A | 40 |
| 4 | D | 1:0.85 | A | 36 |
| 5 | E | 1:0.80 | A | 18 |

Figure 2:
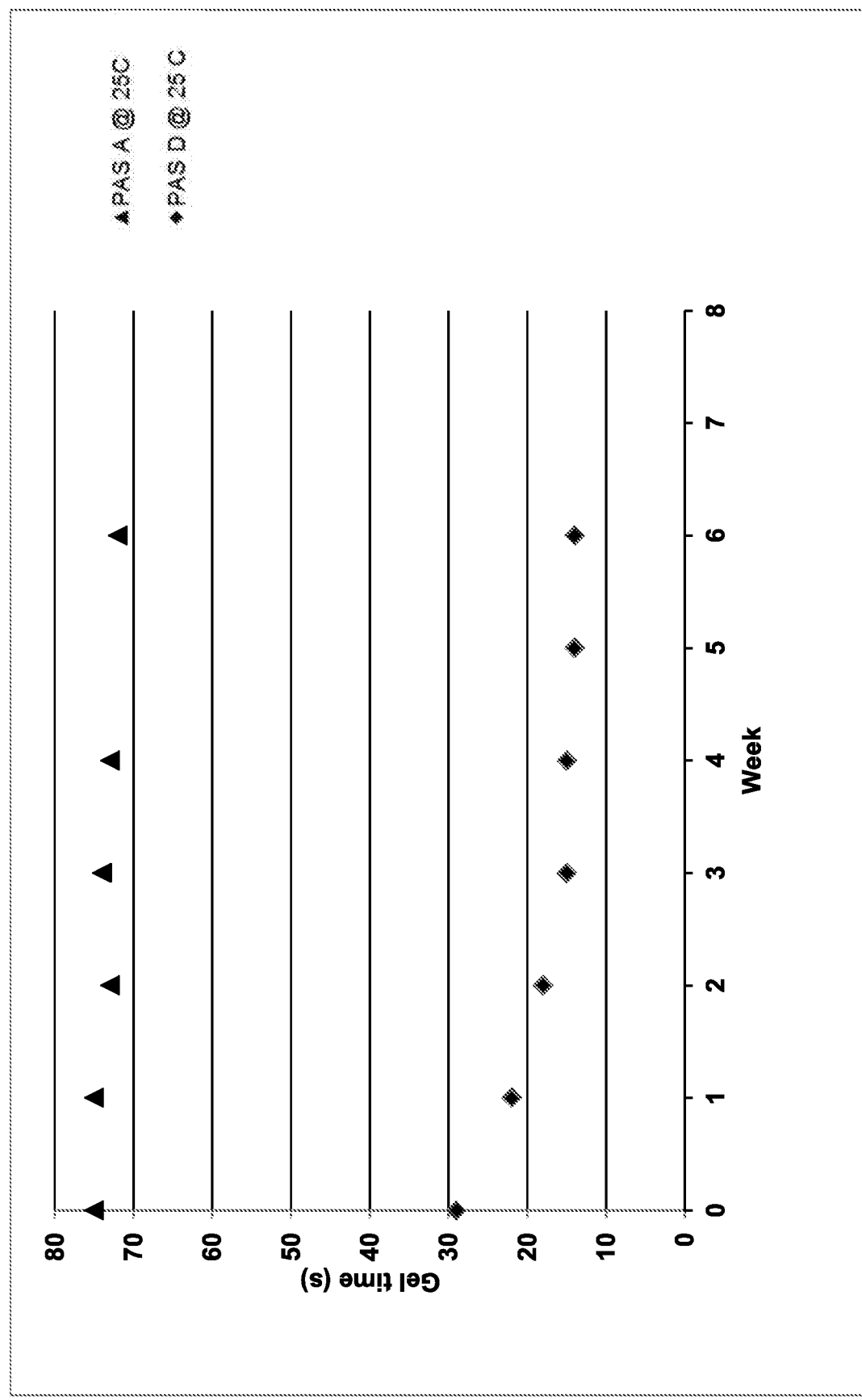
FIG. 2 shows a plot of gel time in seconds over time for various PAS (polyaspartate) compositions combined with ISOCYANATE A.

Table II summarizes gel time in seconds for PAS A and PAS D compositions when combined with ISOCYANATE A after the polyaspartate was stored at 25° C. for multiple weeks. The same data is graphically presented in FIG. 2. As is apparent by reference to Table II and FIG. 2, PAS D (20% less DIESTER A) showed decreased gel times, compared to the commercially available Control, PAS A, when reacted with ISOCYANATE A.

TABLE II

| | POLYASPARTATE | |
|---|---|---|
| | Gel time (seconds) | |
| Week | PAS A | PAS D |
| 0 | 75 | 29 |
| 1 | 75 | 22 |
| 2 | 73 | 18 |
| 3 | 74 | 15 |
| 4 | 73 | 15 |
| 5 | | 14 |
| 6 | 72 | 14 |
| 7 | 72 | 13 |
| 8 | 72 | 12 |

Figure 3:
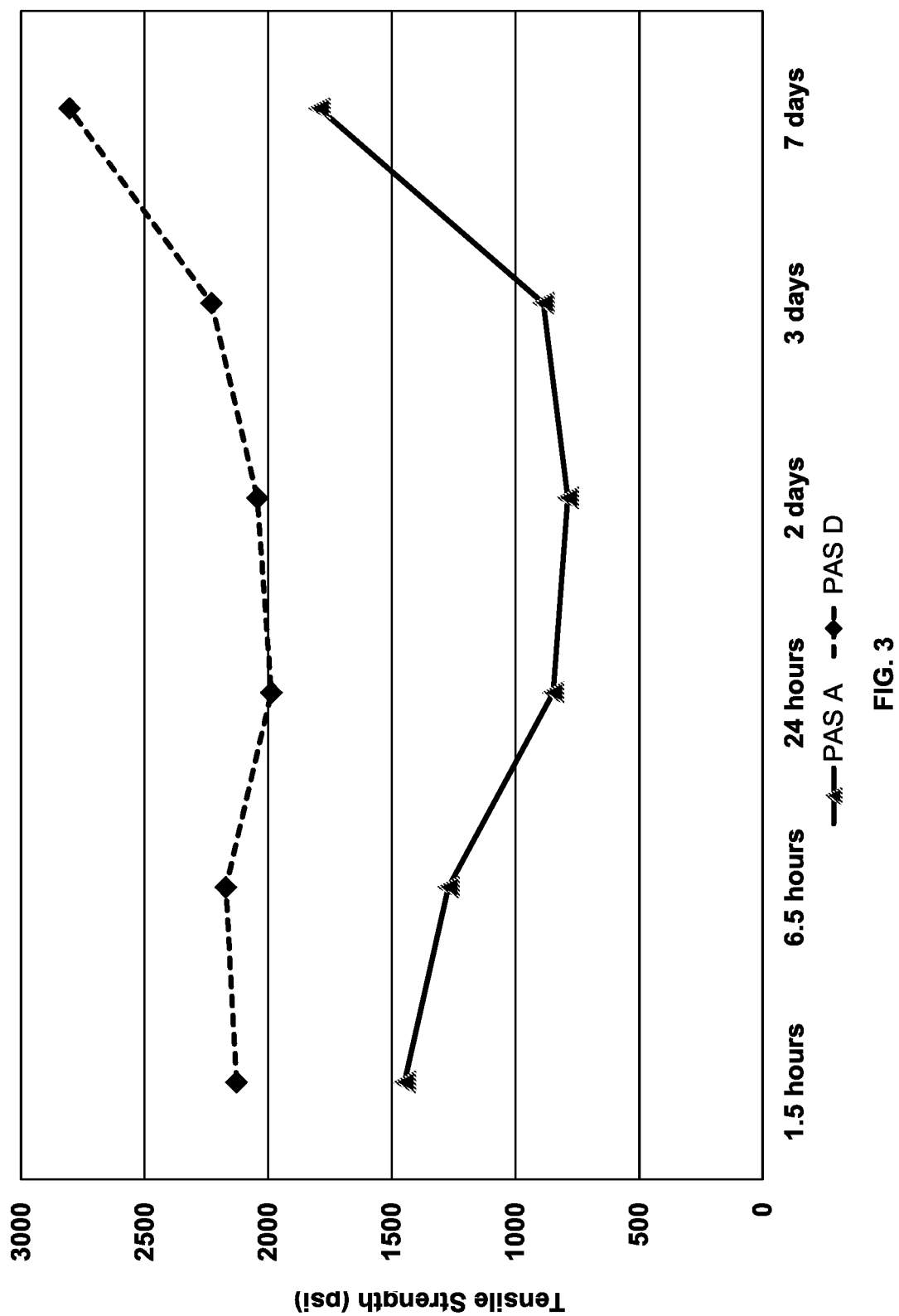
FIG. 3 compares the tensile strength (psi) over time for coatings made from ISOCYANATE B and PAS A or PAS D.
Figure 4:
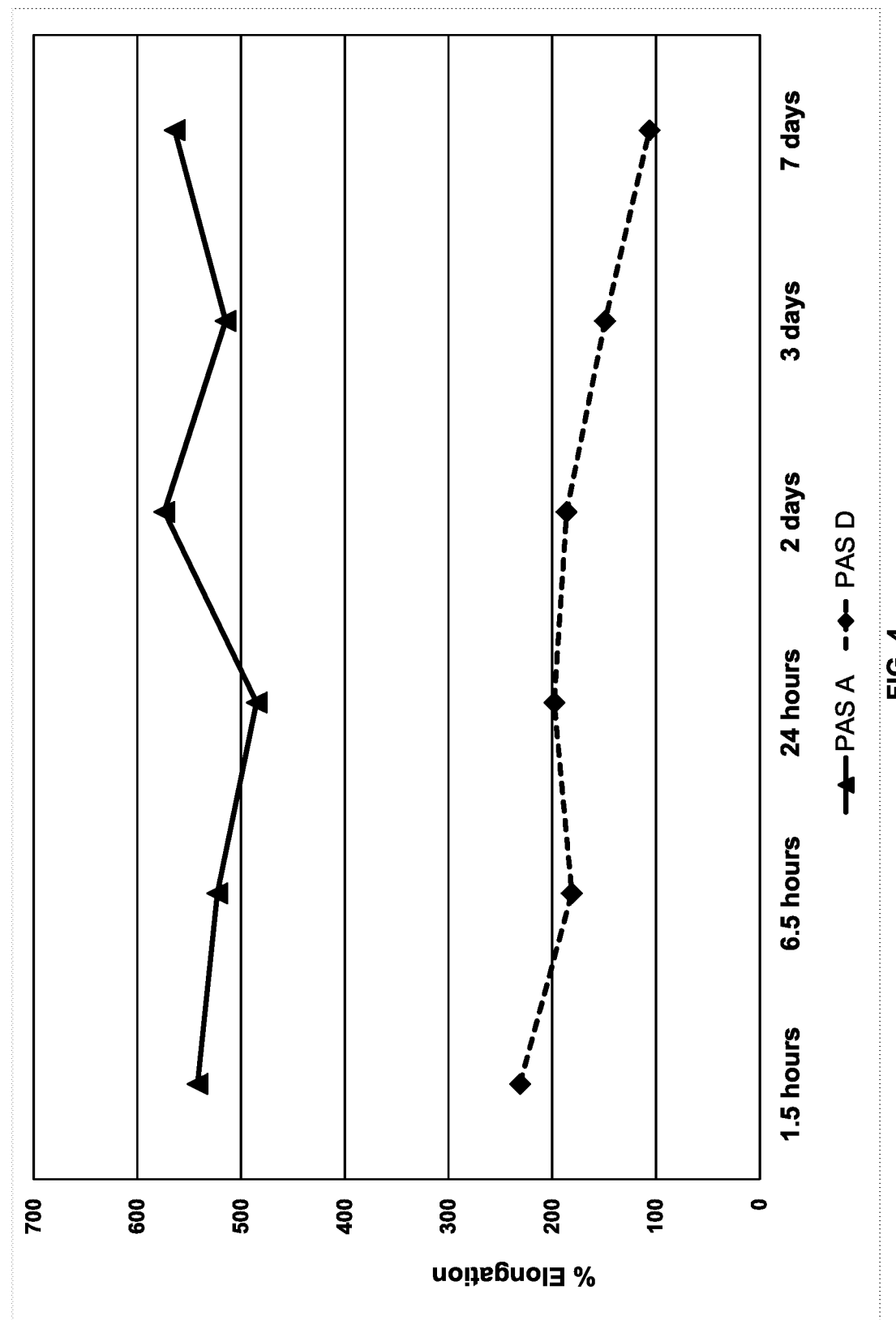
FIG. 4 compares the percent elongation over time for coatings made from ISOCYANATE B and PAS A or PAS D.
Figure 5:
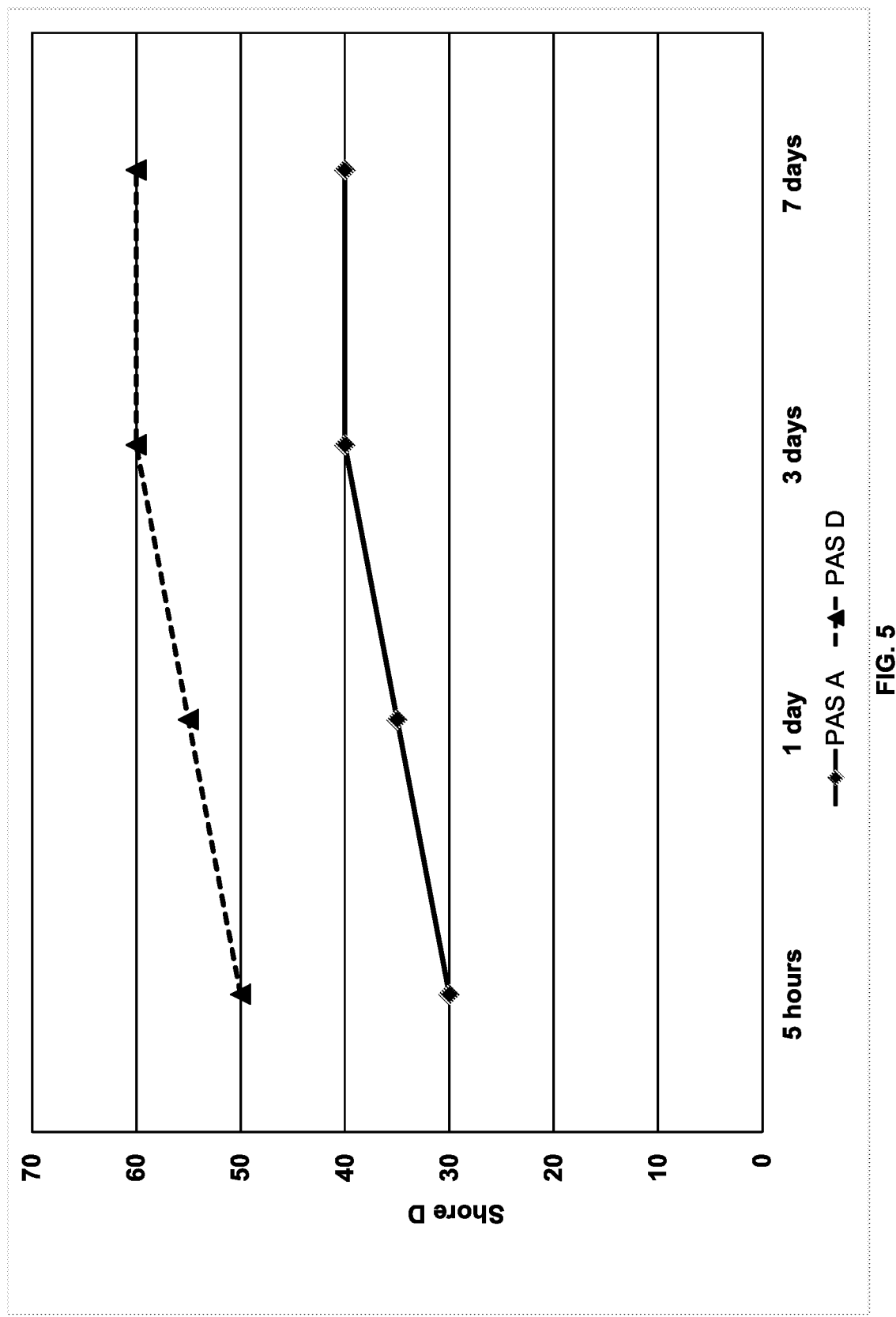
FIG. 5 compares Shore D hardness over time for coatings made from ISOCYANATE B and PAS A or PAS D.

FIG. 3 compares the tensile strength (in psi according to ASTM D638) over multiple days for coatings made from ISOCYANATE B and PAS A or PAS D. FIG. 4 compares the percent elongation (according to ASTM D638) over multiple days for coatings made from ISOCYANATE B and PAS A or PAS D; and FIG. 5 compares Shore D hardness (according to ASTM D2240) over multiple days for coatings made from ISOCYANATE B and PAS A or PAS D. These data show that PAS D provides a polyurea coating with higher hardness and tensile strength.

Another approach to reducing gel times of polyaspartates is blending amines into the polyaspartate composition. Blend compositions were made at equivalent ratios PAS A with DIAMINE B or DIAMINE C as shown in Table III and reacted with ISOCYANATE A. The initial gel times were measured and are summarized in Table III.

TABLE III

| Ex. No. | PAS | Equivalent Ratio of PAS A: DIAMINE | Iso. | Avg. Gel Time (seconds) |
|---|---|---|---|---|
| 1 | CONTROL | 100:0 | A | 81 |
| 6 | PAS A/DIAMINE B | 0.95:0.05 | A | 72 |
| 7 | PAS A/DIAMINE B | 0.80:0.20 | A | 9 |
| 8 | PAS A/DIAMINE C | 0.95:0.05 | A | 77 |
| 9 | PAS A/DIAMINE C | 0.80:0.20 | A | 45 |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. A polyaspartate composition comprising a reaction product of a diamine and a diester reacted at a ratio of diamine equivalents to diester equivalents of from 1:0.95 to 1:0.50.

Clause 2. The polyaspartate composition according to Clause 1, wherein the diester is selected from the group consisting of dimethyl maleate, diethyl maleate, dibutyl maleate, dimethyl fumarate, diethyl fumarate, and dibutyl fumarate.

Clause 3. The polyaspartate composition according to one of Clauses 1 and 2, wherein the diamine is selected from the group consisting of 2-methylpentamethylenediamine (MPMD), 2,2'-dimethyl-4,4'-methylenebis(cyclohexylamine), 4,4'-methylenebis(cyclohexylamine) (PACM), and diethyltoluenediamine (DETDA).

Clause 4. The polyaspartate composition according to any one of Clauses 1 to 3, wherein the diamine and the diester are reacted at a ratio of diamine equivalents to diester equivalents of from 1:0.90 to 1:0.65.

Clause 5. The polyaspartate composition according to any one of Clauses 1 to 4, wherein the diamine and the diester are reacted at a ratio of diamine equivalents to diester equivalents of from 1:0.85 to 1:0.70.

Clause 6. A polyurea composition comprising a reaction product of a polyisocyanate and a polyaspartate composition, wherein the polyaspartate composition comprises a reaction product of a diamine and a diester reacted at a ratio of diamine equivalents to diester equivalents of from 1:0.95 to 1:0.50.

Clause 7. The polyurea composition according to Clause 6, wherein the diester is selected from the group consisting of dimethyl maleate, diethyl maleate, dibutyl maleate, dimethyl fumarate, diethyl fumarate, and dibutyl fumarate.

Clause 8. The polyurea composition according to one of Clauses 6 and 7, wherein the diamine is selected from the group consisting of 2-methylpentamethylenediamine (MPMD), 2,2'-dimethyl-4,4'-methylenebis(cyclohexylamine), 4,4'-methylenebis(cyclohexylamine) (PACM), and diethyltoluenediamine (DETDA).

Clause 9. The polyurea composition according to any one of Clauses 6 to 8, wherein the polyisocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, PDI (pentane diisocyanate--bio-based), benzene diisocyanate, toluene diisocyanate (TDI), diphenylmethane diisocyanate (MDI), 4-isocyanatomethyl-1,8-octane diisocyanate (triisocyanatononane or TIN), isomers of any thereof, and combinations of any thereof.

Clause 10. The polyurea composition according to any one of Clauses 6 to 9, wherein the diamine and the diester are reacted at a ratio of diamine equivalents to diester equivalents of from 1:0.90 to 1:0.65.

Clause 11. The polyurea composition according to any one of Clauses 6 to 10, wherein the diamine and the diester are reacted at a ratio of diamine equivalents to diester equivalents of from 1:0.85 to 1:0.70.

Clause 12. One of a coating composition, an adhesive composition, a sealant composition, a composite composition, a casting composition, and a film composition comprising the polyurea composition according to any one of Clauses 6 to 12.

Clause 13. A coating composition comprising the polyurea according to any one of Clauses 6 to 12.

Clause 14. The coating composition according to Clause 13, further including an additive selected from the group consisting of fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Clause 15. A substrate having applied thereto the coating composition according to one of Clauses 13 and 14.

Clause 16. The substrate according to Clause 15, wherein the substrate is selected from the group consisting of metals, plastics, wood, cement, concrete, and glass.

Clause 17. A method of making a polyaspartate composition comprising reacting a diamine and a diester at a ratio of diamine equivalents to diester equivalents of from 1:0.95 to 1:0.50.

Clause 18. The method according to Clause 17, wherein the diester is selected from the group consisting of dimethyl maleate, diethyl maleate, dibutyl maleate, dimethyl fumarate, diethyl fumarate, and dibutyl fumarate.

Clause 19. The method according to one of Clauses 17 and 18, wherein the diamine is selected from the group consisting of 2-methylpentamethylenediamine (MPMD), 2,2'-dimethyl-4,4'-methylenebis(cyclohexylamine), 4,4'-methylenebis(cyclohexylamine) (PACM), and diethyltoluenediamine (DETDA).

Clause 20. The method according to any one of Clauses 17 to 19, wherein the diamine and the diester are reacted at a ratio of diamine equivalents to diester equivalents of from 1:0.90 to 1:0.65.

Clause 21. The method according to any one of Clauses 17 to 20, wherein the diamine and the diester are reacted at a ratio of diamine equivalents to diester equivalents of from 1:0.85 to 1:0.70.

Clause 22. A method of making a polyurea composition comprising reacting a polyisocyanate with a polyaspartate composition, wherein the polyaspartate composition comprises a reaction product of a diamine and a diester reacted at a ratio of diamine equivalents to diester equivalents of from 1:0.95 to 1: 0.50.

Clause 23. The method according to Clause 22, wherein the polyisocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato -3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl) methane, PDI (pentane diisocyanate-bio-based), benzene diisocyanate, toluene diisocyanate (TDI), diphenylmethane diisocyanate (MDI), 4-isocyanatomethyl-1,8-octane diisocyanate (triisocyanatononane or TIN), isomers of any thereof, and combinations of any thereof.

Clause 24. The method according to one of Clauses 22 and 23, wherein the diester is selected from the group consisting of dimethyl maleate, diethyl maleate, dibutyl maleate, dimethyl fumarate, diethyl fumarate, and dibutyl fumarate.

Clause 25. The method according to any one of Clauses 22 to 24, wherein the diamine is selected from the group consisting of 2-methylpentamethylenediamine (MPMD), 2,2'-dimethyl-4,4'-methylenebis(cyclohexylamine), 4,4'-methylenebis(cyclohexylamine) (PACM), and diethyltoluenediamine (DETDA).

Clause 26. The method according to any one of Clauses 22 to 24, wherein the diamine and the diester are reacted at a ratio of diamine equivalents to diester equivalents of from 1:0.90 to 1:0.50.

Clause 27. The method according to any one of Clauses 22 to 24, wherein the diamine and the diester are reacted at a ratio of diamine equivalents to diester equivalents of from 1:0.85 to 1:0.70.

Clause 28. The method according to any one of Clauses 22 to 27, wherein at least one of cure time and physical property development time is reduced in the polyurea composition and wherein the physical property is selected from the group consisting of hardness and tensile strength.

Clause 29. One of a coating composition, an adhesive composition, a sealant composition, a composite composition, a casting composition, and a film composition comprising the polyurea composition made according to any one of Clauses 22 to 28.

Clause 30. A coating composition comprising the polyurea composition made according to any one of Clauses 22 to 29.

Clause 31. The coating composition according to Clause 30, further including an additive selected from the group consisting of fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Clause 32. A substrate having applied thereto a coating composition made according to one of Clauses 30 and 31.

Clause 33. The substrate according to Clause 32, wherein the substrate is selected from the group consisting of metals, plastics, wood, cement, concrete, and glass.

Clause 34. A method of decreasing at least one of cure time and physical property development time in a first polyurea composition compared to a second polyurea composition, the method comprising: reacting a first polyaspartate composition comprising a reaction product of a diamine and a diester reacted at a ratio of diamine equivalents to diester equivalents of from 1:0.95 to 1:0.50, with a polyisocyanate to produce the first polyurea composition, wherein the second polyurea composition comprises a reaction product of a second polyaspartate composition comprising a reaction product of a diamine and a diester reacted at a ratio of diamine equivalents to diester equivalents of 1:1, with a polyisocyanate, and wherein the physical property is selected from the group consisting of hardness and tensile strength.

What is claimed is:

1. A polyaspartate composition comprising:
    a reaction product of a diamine and a diester reacted at a ratio of diamine equivalents to diester equivalents of from 1:0.85 to 1:0.70.

2. The polyaspartate composition according to claim 1, wherein the diester is selected from the group consisting of dimethyl maleate, diethyl maleate, dibutyl maleate, dimethyl fumarate, diethyl fumarate, and dibutyl fumarate.

3. The polyaspartate composition according to claim 1, wherein the diamine is selected from the group consisting of 2-methylpentamethylenediamine, 2,2'-dimethyl-4,4'-methylenebis(cyclohexylamine), 4,4'-methylenebis(cyclohexylamine), and diethyltoluenediamine.

4. A method of making a polyaspartate composition comprising:
    reacting a diamine and a diester at a ratio of diamine equivalents to diester equivalents of from 1:0.85 to 1:0.70.

5. The method according to claim 4, wherein the diester is selected from the group consisting of dimethyl maleate, diethyl maleate, dibutyl maleate, dimethyl fumarate, diethyl fumarate, and dibutyl fumarate.

6. The method according to claim 4, wherein the diamine is selected from the group consisting of 2-methylpentamethylenediamine, 2,2'-dimethyl-4,4'-methylenebis(cyclohexylamine), 4,4'-methylenebis(cyclohexylamine), and diethyltoluenediamine.

* * * * *